(12) United States Patent
Yoon et al.

(10) Patent No.: US 12,544,872 B2
(45) Date of Patent: Feb. 10, 2026

(54) SERVER FOR PROVIDING ADAPTIVE FEED AMOUNT BASED ON ARTIFICIAL INTELLIGENCE

(71) Applicant: YEONHAP SYSTEM CO., LTD., Gimpo-si (KR)

(72) Inventors: Joonsaam Yoon, Gimpo-si (KR); Hongjae Jeong, Bucheon-si (KR)

(73) Assignee: YEONHAP SYSTEM CO., LTD., Gimpo-si (KR)

( * ) Notice: Subject to any disclaimer, the term of this patent is extended or adjusted under 35 U.S.C. 154(b) by 0 days.

(21) Appl. No.: 19/204,618

(22) Filed: May 12, 2025

(65) Prior Publication Data

US 2025/0269481 A1 Aug. 28, 2025

Related U.S. Application Data

(63) Continuation of application No. PCT/KR2023/017331, filed on Nov. 2, 2023.

(30) Foreign Application Priority Data

Nov. 23, 2022 (KR) .................. 10-2022-0158388
Nov. 1, 2023 (KR) .................. 10-2023-0148986

(51) Int. Cl.
*B23Q 15/12* (2006.01)
*G05B 19/416* (2006.01)

(52) U.S. Cl.
CPC ......... *B23Q 15/12* (2013.01); *G05B 19/4163* (2013.01)

(58) Field of Classification Search
None
See application file for complete search history.

(56) References Cited

U.S. PATENT DOCUMENTS

| 10,261,497 B2 | 4/2019 | Koga | |
|---|---|---|---|
| 2001/0027354 A1* | 10/2001 | Kakino | G05B 19/4163 |
| | | | 700/173 |
| 2019/0196417 A1* | 6/2019 | Uno | G05B 11/42 |

FOREIGN PATENT DOCUMENTS

| JP | 2017-068325 A | 4/2017 |
|---|---|---|
| KR | 10-2014-0078461 A | 6/2014 |
| KR | 10-2019-0043286 A | 4/2019 |
| KR | 10-2182204 B1 | 11/2020 |
| KR | 10-2204906 B1 | 1/2021 |
| KR | 10-2021-0062440 A | 5/2021 |

OTHER PUBLICATIONS

International Search Report for PCT/KR2023/017331 mailed Jan. 30, 2024 from Korean Intellectual Property Office.

* cited by examiner

*Primary Examiner* — Ryan A Jarrett
(74) *Attorney, Agent, or Firm* — Revolution IP, PLLC (57) ABSTRACT

A server for providing an artificial intelligence (AI)-based adaptive feed amount, includes a memory, a communication module that communicates with at least one machine tool, and at least one processor that communicates with the memory and the communication module, wherein the at least one processor is configured to receive an initial reasonable load value from a first machine tool in a unit factory, to obtain at least one of a first recommended feed change amount, a first recommended tool or base-material rotation speed, or a first recommended cut-in amount by inputting a target load value and the initial reasonable load value of the first machine tool to a first AI model, and to transmit, to the first machine tool.

13 Claims, 6 Drawing Sheets

SERVER FOR PROVIDING ADAPTIVE FEED AMOUNT BASED ON ARTIFICIAL INTELLIGENCE

CROSS-REFERENCE TO RELATED APPLICATIONS

The present application is a Continuation of International Patent Application No. PCT/KR2023/017331 filed on Nov. 2, 2023, which is based upon and claims the benefit of priority to Korean Patent Application Nos. 10-2022-0158388 filed on Nov. 23, 2022 and 10-2023-0148986 filed on Nov. 1, 2023. The disclosures of the above-listed applications are hereby incorporated by reference herein in their entirety.

BACKGROUND

Embodiments of the present disclosure described herein relate to a server for monitoring and controlling feed amount, and more particularly, relate to a server providing an artificial intelligence (AI)-based adaptive feed amount.

A machine tool refers to a machine used to process a metal or non-metallic material (hereinafter, "base material") into a part having a shape and dimension by using an appropriate tool or to add more precise processing in various cutting or non-cutting processing methods.

The machine tool is rapidly progressing in automation and numerical control throughout the industry to improve productivity and to produce various processed products. In addition, computer numerical control is being applied, thereby creating a wide demand in industrial sites.

In the meantime, as smart factories become a major issue for manufacturers, corporate data and process-related data are being digitized or online through the introduction of systems such as enterprise resource planning (ERP), manufacturing execution system (MES), supply chain management (SCM), warehouse management system (WMS), and product life cycle management (PLM).

Accordingly, research is ongoing to efficiently connect automated equipment such as machine tools to systems for smart factories, and solutions for monitoring machine tools are being developed.

SUMMARY

Embodiments of the present disclosure provide a server providing an AI-based adaptive feed amount.

Problems to be solved by the present disclosure are not limited to the problems mentioned above, and other problems not mentioned will be clearly understood by those skilled in the art from the following description.

According to an embodiment, a server for providing an artificial intelligence (AI)-based adaptive feed amount includes a memory, a communication module that communicates with at least one machine tool, and at least one processor that communicates with the memory and the communication module. The at least one processor is configured to receive an initial reasonable load value from a first machine tool in a unit factory, to obtain at least one of a first recommended feed change amount, a first recommended tool or base-material rotation speed, or a first recommended cut-in amount by inputting a target load value and the initial reasonable load value of the first machine tool to a first AI model, and to transmit, to the first machine tool, a first control signal for controlling an operation of the first machine tool based on at least one of the first recommended feed change amount, the first recommended tool or base-material rotation speed, or the first recommended cut-in amount.

Moreover, the at least one processor may receive a first feed value of the first machine tool changed based on the first control signal, and a first load value changed in response to the first feed value from the first machine tool, may obtain a second recommended feed change amount based on the first feed value, the first load value, and the target load value, and may transmit a second control signal including the second recommended feed change amount to the first machine tool.

Furthermore, the target load value may be determined based on at least one of a replacement cycle of a worker of the first machine tool or a setting time of the first machine tool.

Also, the at least one processor may change the target load value through the changed replacement cycle of the worker on a basis of a fact that the replacement cycle of the worker of the first machine tool is changed.

Besides, the target load value may be determined based on a target number of processed products to be produced through the first machine tool during a predetermined time.

In addition, the one or more processors may obtain the target load value by inputting the target number of processed products and a processed product unit load value into a second AI model.

Moreover, the target load value may be determined based on at least one of a type of a processed product produced by the first machine tool or whether a type of a processed product is replaced during a predetermined time.

Furthermore, the at least one processor may determine a feed change amount corresponding to each of the plurality of machine tools based on an initial load value obtained from each of the plurality of machine tools on a basis of a fact that a plurality of machine tools are provided in the unit factory.

Also, on a basis of the plurality of machine tools operating in time-series sequence, the at least one processor may specify an operating time domain corresponding to each of the plurality of machine tools, and may determine the target load value based on the operating time domain corresponding to each of the plurality of machine tools.

Besides, first training data may include a first training target load value, a first initial training load value, and a first target processed product unit feed change amount. The first AI model may be trained to output the first target processed product unit feed change amount based on the first training target load value and the first initial training load value.

In addition, second training data may include a second training target load value, a second initial training load value, a training processed product production amount, and a second target processed product unit feed change amount. The second AI model may be trained to output the second target processed product unit feed change amount based on the second training target load value, the second initial training load value, and the training processed product production amount.

Moreover, the at least one processor may obtain a pattern of load values per unit time output by the first machine tool, and may determine whether the pattern of load values per unit time matches a predefined pattern.

Furthermore, the at least one processor may transmit a third control signal for stopping an operation of the machine tool to the first machine tool, based on a fact that the pattern of load values per unit time does not match the predefined pattern.

Also, the at least one processor may predict a processed product production completion time of the first machine tool according to the target load value, and may transmit the predicted processed product production completion time to a terminal device used by a worker of the first machine tool.

According to an embodiment, a method for providing an AI-based adaptive feed amount performed by a server includes receiving an initial reasonable load value from a first machine tool in a unit factory, obtaining at least one of a first recommended feed change amount, a first recommended tool or base-material rotation speed, or a first recommended cut-in amount by inputting a target load value and the initial reasonable load value of the first machine tool to a first AI model, and transmitting, to the first machine tool, a first control signal for controlling an operation of the first machine tool based on at least one of the first recommended feed change amount, the first recommended tool or base-material rotation speed, or the first recommended cut-in amount.

Besides, a computer program stored in a computer-readable recording medium for implementing the present disclosure may be further provided.

In addition, a computer-readable recording medium for recording a computer program for implementing the present disclosure may be further provided.

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION

The same reference numerals denote the same elements throughout the present disclosure. The present disclosure does not describe all elements of embodiments. Well-known content or redundant content in which embodiments are the same as one another will be omitted in a technical field to which the present disclosure belongs. A term such as 'unit, module, member, or block' used in the specification may be implemented with software or hardware. According to embodiments, a plurality of 'units, modules, members, or blocks' may be implemented with one component, or a single 'unit, module, member, or block' may include a plurality of components.

Throughout this specification, when it is supposed that a portion is "connected" to another portion, this includes not only a direct connection, but also an indirect connection. The indirect connection includes being connected through a wireless communication network.

Furthermore, when a portion "comprises" a component, it will be understood that it may further include another component, without excluding other components unless specifically stated otherwise.

Throughout this specification, when it is supposed that a member is located on another member "on", this includes not only the case where one member is in contact with another member but also the case where another member is present between two other members.

Terms such as 'first', 'second', and the like are used to distinguish one component from another component, and thus the component is not limited by the terms described above.

Unless there are obvious exceptions in the context, a singular form includes a plural form.

In each step, an identification code is used for convenience of description. The identification code does not describe the order of each step. Unless the context clearly states a specific order, each step may be performed differently from the specified order.

Hereinafter, operating principles and embodiments of the present disclosure will be described with reference to the accompanying drawings.

In this specification, an 'apparatus according to an embodiment of the present disclosure' includes all various devices capable of providing results to a user by performing arithmetic processing. For example, the apparatus according to an embodiment of the present disclosure may include all of a computer, a server device, and a portable terminal, or may be in any one form.

Here, for example, the computer may include a notebook computer, a desktop computer, a laptop computer, a tablet PC, a slate PC, and the like, which are equipped with a web browser.

The server device may be a server that processes information by communicating with an external device and may include an application server, a computing server, a database server, a file server, a game server, a mail server, a proxy server, and a web server.

For example, the portable terminal may be a wireless communication device that guarantees portability and mobility, and may include all kinds of handheld-based wireless communication devices such as a smartphone, a personal communication system (PCS), a global system for mobile communication (GSM), a personal digital cellular (PDC), a personal handyphone system (PHS), a personal digital assistant (PDA), International Mobile Telecommunication (IMT)-2000, a code division multiple access (CDMA)-2000, W-Code Division Multiple Access (W-CDMA), and Wireless Broadband Internet (WiBro) terminal, and a wearable device such as a timepiece, a ring, a bracelet, an anklet, a necklace, glasses, a contact lens, or a head-mounted device (HMD).

Functions related to artificial intelligence according to an embodiment of the present disclosure are operated through a processor and a memory. The processor may consist of one or more processors. In this case, the one or more processors may be a general-purpose processor (e.g., a CPU, an AP, or a digital signal processor (DSP)), a graphics-dedicated processor (e.g., a GPU or a vision processing unit (VPU)), or an artificial intelligence (AI)-dedicated processor (e.g., an NPU). Under control of the one or more processors, input data may be processed depending on an AI model, or a predefined operating rule stored in the memory. Alternatively, when the one or more processors are AI-dedicated processors, the AI-dedicated processor may be designed with a hardware structure specialized for processing a specific AI model.

The predefined operating rule or the artificial intelligence model is created through learning. Here, being created through learning means creating the predefined operating rule or the artificial intelligence model configured to perform desired features (or purposes) as a basic artificial intelligence model is learned by using pieces of learning data by a learning algorithm. This learning may be performed by an apparatus itself, on which the artificial intelligence according to an embodiment of the present disclosure is performed, or may be performed through a separate server and/or system. For example, the learning algorithm may include supervised learning, unsupervised learning, semi-supervised learning, or reinforcement learning, but may not be limited to the above example.

An artificial intelligence model may be composed of a plurality of neural network layers. The plurality of neural network layers respectively have a plurality of weight values, and each of the plurality of neural network layers performs neural network calculation through calculations between the calculation result of the previous layer and the plurality of weight values. The plurality of weight values of the plurality of neural network layers may be optimized by the learning result of the artificial intelligence model. For example, during a learning process, the plurality of weight values may be updated such that a loss value or a cost value obtained from the artificial intelligence model is reduced or minimized. The artificial neural network may include a deep neural network (DNN). The artificial neural network may be, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, but is not limited to the above-described example.

According to an embodiment of the present disclosure, a processor may implement artificial intelligence. The artificial intelligence may refer to an artificial neural network-based machine learning method that allows a machine to perform learning by simulating human biological neurons. The methodology of artificial intelligence may be classified as supervised learning, in which a solution (output data) to a problem (input data) is determined by providing input data and output data together as training data depending on a learning method, unsupervised learning, in which only input data is provided without output data, and thus the solution (output data) to the problem (input data) is not determined, and reinforcement learning, in which a reward is given from an external environment whenever an action is taken in a current state, and thus learning progresses to maximize this reward. Moreover, the methodology of artificial intelligence may also be categorized depending on architecture, which is the structure of the learning model. The architecture of deep learning technology widely used may be categorized into convolutional neural networks (CNN), recurrent neural networks (RNN), transformers, and generative adversarial networks (GAN).

Each of the apparatus and the system may include an artificial intelligence model. The artificial intelligence model may be a single artificial intelligence model or may be implemented as a plurality of artificial intelligence models. The artificial intelligence model may be composed of neural networks (or artificial neural networks) and may include a statistical learning algorithm that mimics biological neurons in machine learning and cognitive science. The neural network may refer to a model as a whole having the ability to solve problems as artificial neurons (nodes), which form a network by connecting synapses, changes the strength of their synaptic connections through learning. Neurons in the neural network may include the combination of weight values or biases. The neural network may include one or more layers consisting of one or more neurons or nodes. For example, the apparatus may include an input layer, a hidden layer, and an output layer. The neural network constituting the apparatus may infer the result (output) to be predicted from an arbitrary input by changing a weight value of a neuron through learning.

The processor may create a neural network, may train or learn a neural network, or may perform operations based on received input data, and then may generate an information signal or may retrain the neural network based on the performed results. Models of a neural network may include various types of models such as a convolution neural network (CNN) (e.g., GoogleNet, AlexNet, or VGG Network), a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzman machine (RBM), a fully convolutional network, a long short-term memory (LSTM) Network, and a classification network, but is not limited thereto. The processor may include one or more processors for performing computations according to the models of the neural network. For example, the neural network may include a deep neural network.

It will be understood by those skilled in the art that a neural network may include any neural network, but is not limited to a convolutional neural network (CNN), a recurrent neural network (RNN), a perceptron, a multilayer perceptron, a feed forward (FF), a radial basis network (RBF), a deep feed forward (DFF), a long short term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN).

According to an embodiment of the present disclosure, the processor may use various artificial intelligence structures and algorithms such as a convolution neural network (CNN) (e.g., GoogleNet, AlexNet, or VGG Network), a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzman machine (RBM), a fully convolutional network, a long short-term memory (LSTM) Network, a classification network, Generative Modeling, explainable AI, Continual AI, Representation Learning, AI for Material Design, algorithms for natural language processing (e.g., BERT, SP-BERT, MRC/QA, Text Analysis, Dialog System, GPT-3, and GPT-4), algorithms for vision processing (e.g., Visual Analytics, Visual Understanding, Video Synthesis, and ResNet), algorithms for data intelligence (e.g., Anomaly Detection, Prediction, Time-Series Forecasting, Optimization, Recommendation, and Data Creation), but is not limited thereto. Hereinafter, an embodiment of the present disclosure will be described in detail with reference to the accompanying drawings.

In describing the present disclosure, a 'machine tool' means a machine that manufactures or processes various machines, and an object processed by the machine tool may be defined as a 'workpiece' or 'processed product'.

Figure 1:
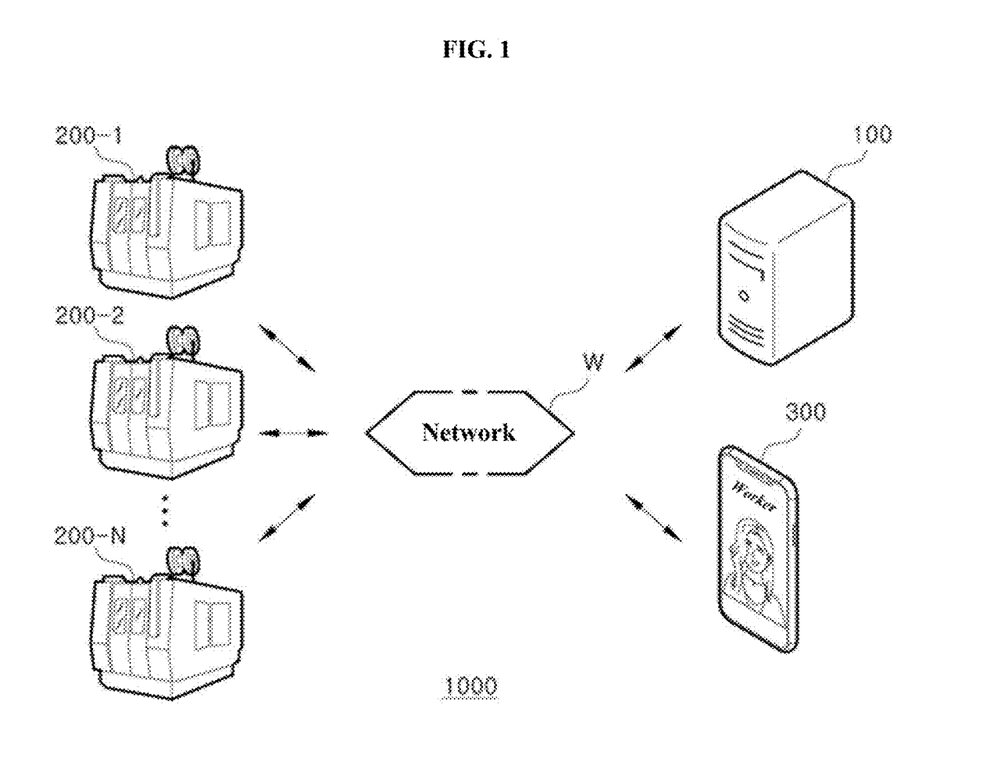
FIG. 1 is a diagram illustrating a system for providing an AI-based adaptive feed amount, according to an embodiment of the present disclosure.

FIG. 1 is a diagram illustrating a system for providing an AI-based adaptive feed amount, according to an embodiment of the present disclosure.

As illustrated in FIG. 1, a system 1000 providing an AI-based adaptive feed amount may include a server 100 used by a user, a plurality of machine tools 200-1, 200-2, . . . , and 200-N ('N' is a natural number greater than or equal to 2), and a terminal device 300 used by a worker.

The server 100, the plurality of machine tools 200-1, 200-2, . . . , and 200-N) ('N' is a natural number greater than or equal to 2), and the terminal device 300 used by a worker, which are included in the system 1000, may communicate over a network 'W'. Here, the network 'W' may include wired networks and wireless networks. For example, a network may include various networks, such as a local area network (LAN), a metropolitan area network (MAN), and a wide area network (WAN).

Moreover, the network 'W' may also include the World Wide Web (WWW). However, the network 'W' according to an embodiment of the present disclosure is not limited to the enumerated networks, and may include at least part of a known wireless data network, a known telephone network, or a known wired/wireless television network.

The server 100 may obtain a recommended feed change amount based on an initial reasonable load value and a target load value of at least one machine tool provided in a unit factory. The server may transmit a control signal including a recommended feed change amount to the at least one machine tool, and thus the at least one machine tool may change a feed value so as to match the target load value.

In describing the present disclosure, the "feed value" means a speed at which a tool in a machine tool moves relative to a workpiece, and the "load value" means the force that the tool applies to the workpiece.

In detail, the "feed value" may be a value obtained by dividing a distance, at which the tool moves relative to the workpiece, by the time, and the unit thereof may be 'mm/min' or 'mm/rev'. The feed value may be determined depending on the material of the workpiece, the shape of the tool, and a cutting condition. In general, as the material is harder, the shape of the tool is sharper, and the cutting condition is more severe, the feed value needs to be lower.

The "load value" indicates the force that the tool applies to the workpiece, and the unit thereof is 'N' or 'kgf'. The load value may be determined depending on the material of the workpiece, the shape of the tool, and a cutting condition. In general, as the material is harder, the shape of the tool is sharper, and the cutting condition is more severe, the load value needs to be higher.

As the feed value increases, the force that the tool applies to the workpiece increases, thereby increasing the load value. Accordingly, when the feed value is set, the feed value needs to be set in consideration of the load value.

The plurality of machine tools 200-1, 200-2, . . . , and 200-N may produce the workpiece by changing the feed value depending on a control signal received from the server 100.

The terminal device 300 used by the worker may receive various pieces of data from the server 100 or/and the plurality of machine tools 200-1, 200-2, . . . , and 200-N.

A configuration of the server 100 and specific operations performed by a device will be described with reference to FIGS. 2 to 6.

Figure 2:
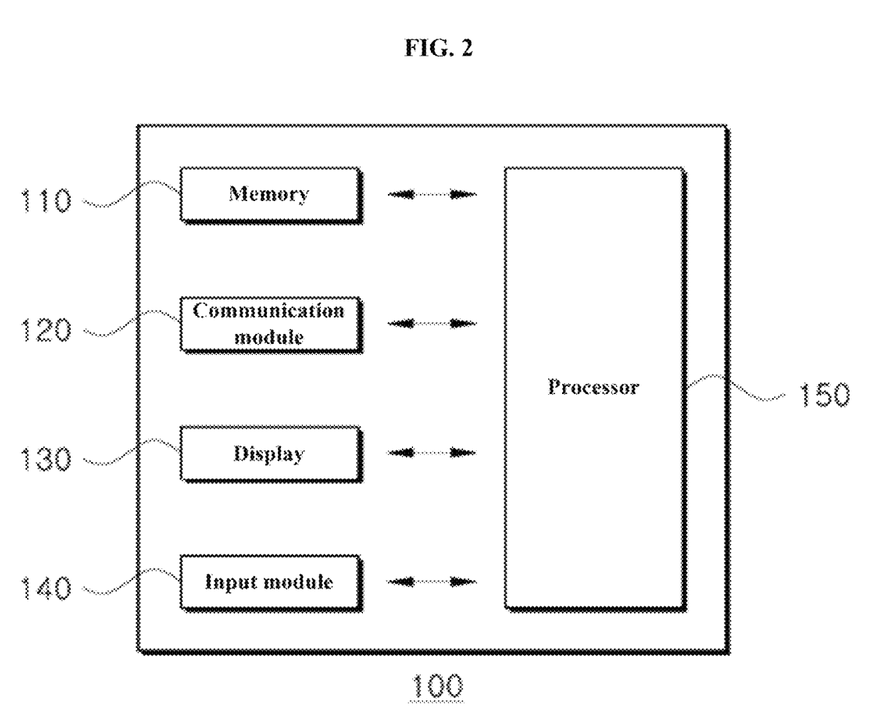
FIG. 2 is a block diagram illustrating a configuration of a server providing AI-based adaptive feed amount, according to an embodiment of the present disclosure.

FIG. 2 is a block diagram illustrating a configuration of a server providing AI-based adaptive feed amount, according to an embodiment of the present disclosure.

As illustrated in FIG. 2, the server 100 may include a memory 110, a communication module 120, a display 130, an input module 140, and a processor 150. However, it is not limited thereto. Software and hardware configurations of the server 100 may be modified/added/omitted within a range obvious to those skilled in the art depending on the required operation.

The memory 110 may store data supporting various functions of the server 100 and a program for the operation of the processor 150, may store pieces of input/output data (e.g., music files, still images, videos, and the like), and may store a plurality of application programs (or applications) running on the present device, pieces of data, and commands for operations of the server 100. At least part of the application programs may be downloaded from an external server through wireless communication.

The memory 110 may include the type of a storage medium of at least one of a flash memory type, hard disk type, a solid state disk (SSD) type, a silicon disk drive (SDD) type, a multimedia card micro type, a memory of a card type (e.g., SD memory, XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc.

The communication module 120 may include one or more components capable of communicating with an external device, and may include, for example, at least one of a broadcast reception module, a wired communication module, a wireless communication module, a short-range communication module, and a location information module.

Here, in addition to various wired communication modules such as a Local Area Network (LAN) module, a Wide Area Network (WAN) module, or a Value Added Network (VAN) module, the wired communication module may include a variety of cable communication modules such as Universal Serial Bus (USB), High Definition Multimedia Interface (HDMI), Digital Visual Interface (DVI), recommended standard232 (RS-232), power line communication, or plain old telephone service (POTS).

Here, the wireless communication module may include a wireless communication module for supporting various wireless communication methods such as Global System for Mobile (GSM) communication, Code Division Multiple Access (CDMA), Wideband Code Division Multiple Access (WCDMA), Universal Mobile Telecommunication System (UMTS), Time Division Multiple Access (TDMA), Long Term Evolution (LTE), 4G, 5G, and 6G in addition to a Wi-Fi module and Wireless broadband module.

The display 130 displays (outputs) information (e.g., an initial load value received from the machine tool, or the like) processed by the server 100.

For example, the display may display execution screen information of an application program (e.g., an application) running on the server 100, or a user interface (UI) or graphical user interface (GUI) information according to such the execution screen information. The type of the UI output on the display 130 will be described later.

The input module 140 may be used to receive information from a user. When information is entered through a user input unit, the processor 150 may control operations of the server 100 so as to correspond to the input information.

This input module 140 may include a hardware-type physical key (e.g., a button, a dome switch, a jog wheel, or a jog switch that is located on at least one of the front, back, and sides of the present apparatus) and a software-type touch key. For example, the touch key may consist of a virtual key, a soft key, or a visual key displayed on the display 130 of a touch screen-type through software processing or may consist of a touch key positioned on a portion other than the touch screen. In the meantime, the virtual key or the visual key may be displayed on the touch screen while having various shapes. For example, the virtual key or visual key may be formed of graphics, texts, icons, video, or a combination thereof.

The processor 150 may be implemented with a memory that stores data regarding an algorithm for controlling operations of components within the server 100, or a program for implementing the algorithm, and the at least one processor (not illustrated) that performs the above-described operation by using the data stored in the memory. At this time, the memory and the processor may be implemented as separate chips. Alternatively, the memory and the processor may be implemented as a single chip.

Furthermore, the processor 150 may control one of the components described above or the combination of the components to implement various embodiments of the present disclosure described below with reference to FIGS. 3 to 6 on the server 100.

Figure 3:
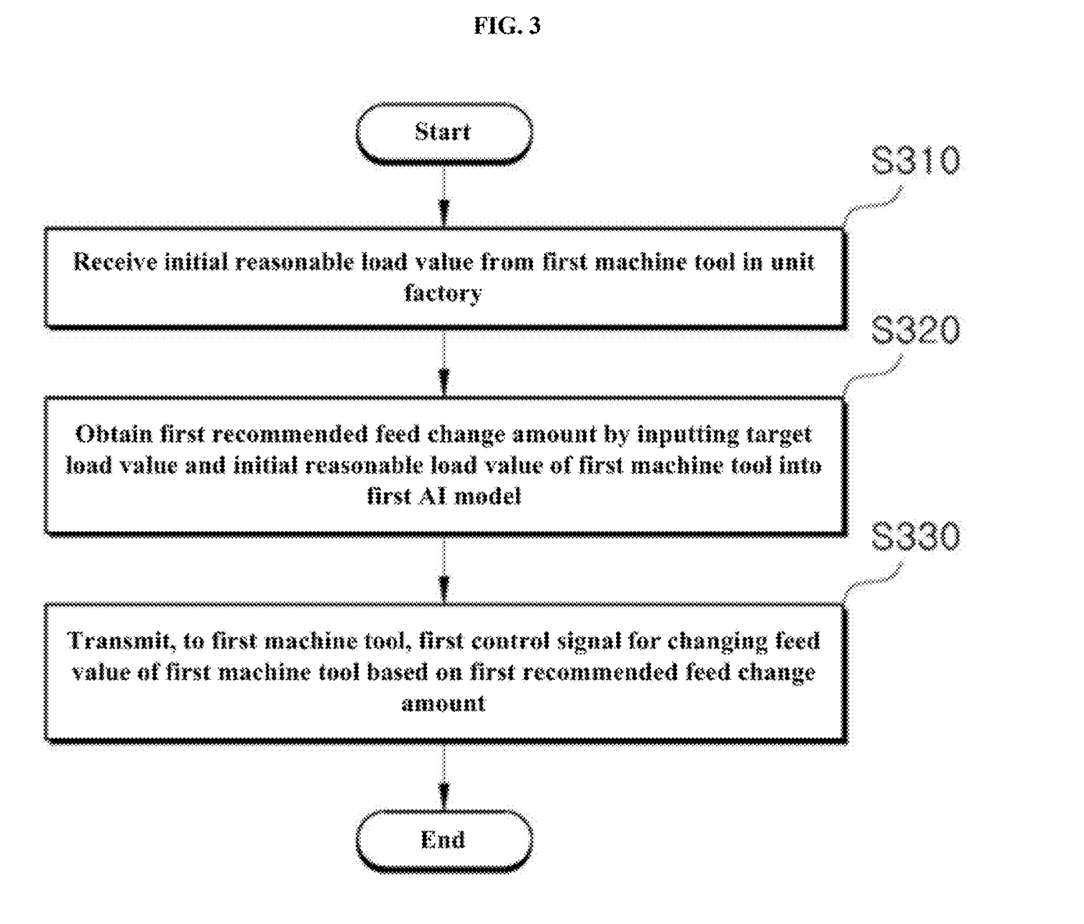
FIG. 3 is a flowchart illustrating a method for providing AI-based adaptive feed amount, according to an embodiment of the present disclosure.

FIG. 3 is a flowchart illustrating a method for providing AI-based adaptive feed amount, according to an embodiment of the present disclosure.

A server may receive an initial reasonable load value from a first machine tool in a unit factory (S310).

That is, the first machine tool may set an initial feed value to produce a processed product, and the server may receive the initial feed value from the first machine tool. For another example, the server may obtain the initial feed value of the first machine tool through a terminal device used by a worker.

The server may obtain a first recommended feed change amount by inputting a target load value and an initial reasonable load value of the first machine tool into a first AI model (S320).

In detail, the server may obtain at least one of the first recommended feed change amount, a first recommended tool or base-material rotation speed, or a first recommended cut-in amount by inputting the target load value and the initial reasonable load value of the first machine tool to the first AI model.

Here, the first AI model may be trained based on first training data. For example, the first AI model may be trained to output a first target processed product unit feed change amount, a first tool or base-material rotation speed, or a first cut-in amount based on the first training target load value and the first initial training load value included in the first training data.

In other words, the server may obtain at least one of the first recommended feed change amount, the first recommended tool or base-material rotation speed, or the first recommended cut-in amount by inputting the target load value and the initial reasonable load value of the first machine tool into the pre-trained first AI model.

That is, the server may obtain the cut-in amount, the tool or base-material rotation speed, and/or the feed change amount of the first machine tool capable of reaching the first target load value through the first AI model. Without a need for expensive sensors on a machine tool to collect pieces of data, the server may obtain the optimal feed change amount, the optimal tool or base-material rotation speed, and/or the optimal cut-in amount by inputting the initial reasonable load value into the first AI model.

In the meantime, the target load value refers to a processed product unit load (or current) value optimized for producing the processed product. The server may receive the target load value of the first machine tool from the first machine tool, but may also set/determine/change the target load value through data related to the first machine tool.

As an example of the present disclosure, the target load value may be determined based on at least one of a worker replacement cycle of the first machine tool or the setting time of the first machine tool. Accordingly, when the worker replacement cycle of the first machine tool changes, the server may change the target load value through the changed worker replacement cycle.

For example, when the worker of the first machine tool is replaced, the target load value may be set to decrease or increase. As another example, when the setting time of the first machine tool enters a threshold range, the target load value may be set to decrease.

As another example of the present disclosure, the target load value may be determined based on the target number of processed products to be produced through the first machine tool during a predetermined time.

Figure 4:
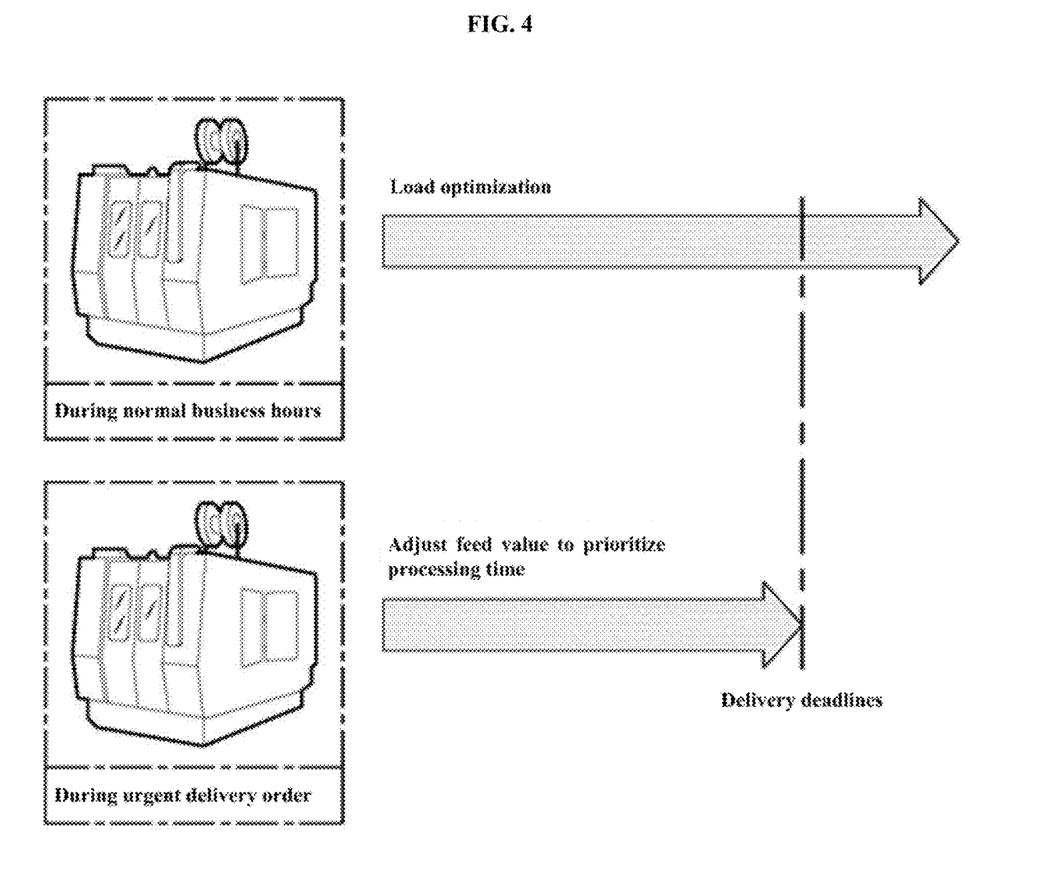
FIG. 4 is a drawing for describing a method for controlling a feed amount for an urgent delivery order, according to an embodiment of the present disclosure.

For example, as shown in FIG. 4, when the target number of processed products to be produced through the first machine tool during a predetermined time increases (i.e., when an urgent delivery order is entered), the target load value may also increase (i.e., increasing a load value by increasing the feed value, the tool or base-material rotation speed, or/and the cut-in amount).

That is, as the target load value increases, the feed value, the tool or base-material rotation speed, or/and the cut-in amount of the first machine tool may increase to reach the target load value. Accordingly, the number of processed products capable of being produced per unit time may be increased (i.e., the delivery deadline is capable of being met).

For example, the server may obtain the target load value by inputting the target number of processed products (i.e., a target production amount) and a processed product unit load value to a second AI model.

Here, the second AI model may be trained based on second training data. In detail, the second AI model may be trained to output a second target processed product unit feed change amount, a second tool or base-material rotation speed, and/or a second cut-in amount based on the second training data including a second training target load value, a second initial training load value, and a training processed product production amount.

As an example of the present disclosure, the server may predict a processed product production completion time of the first machine tool according to the target load value. The server may transmit the predicted processed product production completion time to the terminal device used by the worker of the first machine tool.

As another example of the present disclosure, the target load value may be determined based on at least one of the type of a processed product produced by the first machine tool or whether the type of the processed product is replaced during a predetermined time.

For example, the target load value may decrease during a point in time when the type of the processed product is replaced. As another example, when the processed product requires a strong feed value, a strong tool or base-material rotation speed, and/or a strong cut-in amount, the target load value may be increased.

The server may transmit, to the first machine tool, a first control signal for changing the feed value of the first machine tool based on the first recommended feed change amount (S330).

In detail, the server may transmit, to the first machine tool, a first control signal for controlling an operation of the first machine tool based on at least one of the first recommended feed change amount, the first recommended tool or base-material rotation speed, or the first recommended cut-in amount.

The first machine tool may change the feed value so as to be suitable for the first recommended feed change amount, the first recommended tool or base-material rotation speed, and/or the first recommended cut-in amount, based on the first control signal.

For example, the server may receive a first feed value of the first machine tool changed based on the first control signal, and a first load value changed in response to the first feed value from the first machine tool. The server may obtain a second recommended feed change amount based on the first feed value, the first load value and the target load value. The server may transmit a second control signal including the second recommended feed change amount to the first machine tool.

The server may repeat the above-described operations until the feed value of the first machine tool corresponds to the target load value.

As an example of the present disclosure, the server may obtain a pattern of load values per unit time output by the first machine tool. That is, the server may obtain the load value according to time change from the first machine tool. The server may generate the load value in graph form over time. The server may identify patterns of load values over time generated in graph form. The server may determine whether a pattern of load values per unit time matches a predefined pattern.

For example, on the basis of the fact that the pattern of load values per unit time does not match the predefined pattern, the server may determine that the first machine tool is operating abnormally. The server may transmit a third control signal for stopping the operation of the machine tool to the first machine tool.

Additionally or alternatively, the server may obtain information about whether the first machine tool is operating normally, by inputting the load value per unit time into a third AI model. The third AI model may be trained to identify the pattern of load values per unit time through the input load values per unit time, and to output information about whether the first machine tool is operating normally, based on whether the identified pattern of load values per unit time matches the predefined pattern.

Figure 5:
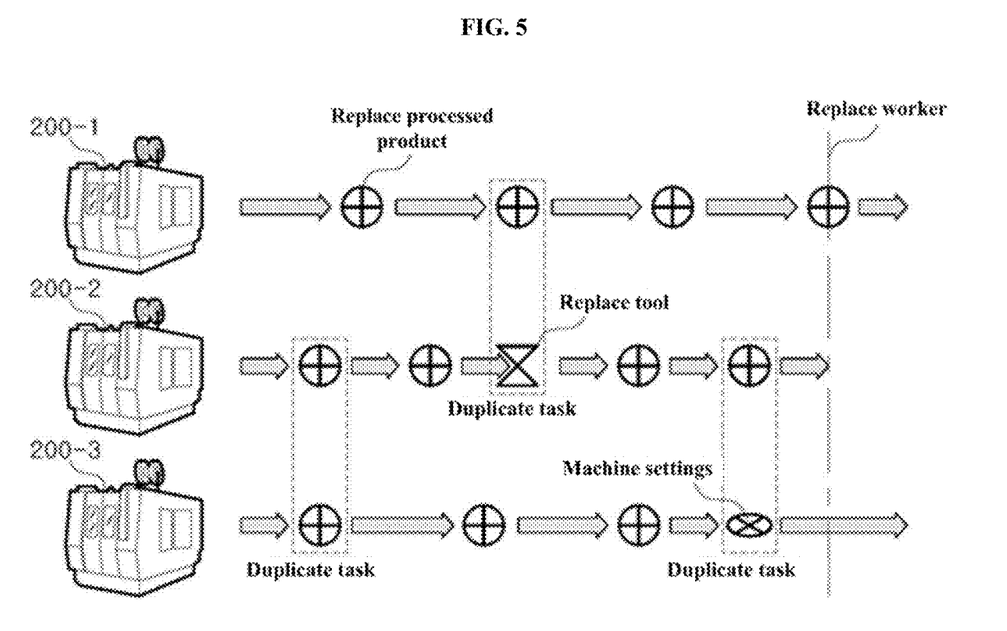
FIGS. 5 and 6 are diagrams illustrating a method for controlling feed amounts of a plurality of machine tools, according to an embodiment of the present disclosure.
Figure 6:
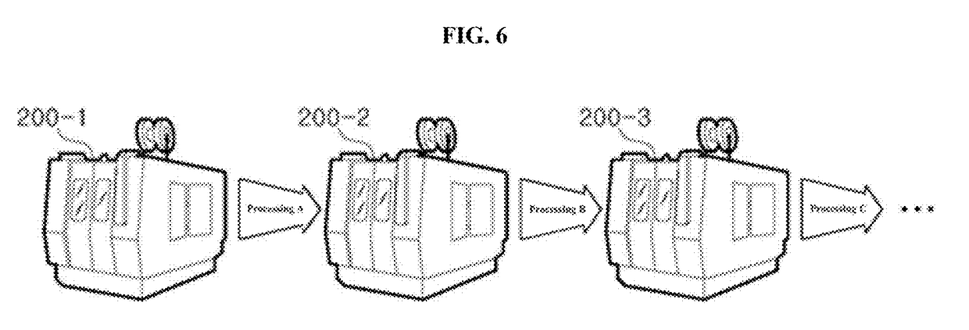

FIGS. 5 and 6 are diagrams illustrating a method for controlling feed amounts of a plurality of machine tools, according to an embodiment of the present disclosure. That is, FIGS. 5 and 6 are drawings for describing the operation of a server when a plurality of machine tools are provided in a unit factory.

For example, as illustrated in FIG. 5, a plurality of machine tools 200-1, 200-2, and 200-3 may produce processed products in parallel. For another example, as illustrated in FIG. 6, each of the plurality of machine tools 200-1, 200-2, and 200-3 may produce one processed product by sequentially performing a separate processing procedure.

The server may determine a feed change amount corresponding to each of the plurality of machine tools based on an initial load value obtained from each of the plurality of machine tools 200-1, 200-2, and 200-3. That is, the server may determine a recommended feed change amount corresponding to each of the plurality of machine tools by applying the method described with reference to FIG. 3 to each of the plurality of machine tools 200-1, 200-2, and 200-3.

As an example of the present disclosure, when the plurality of machine tools 200-1, 200-2, and 200-3 operate in time series sequence, the server may specify an operating time domain corresponding to each of the plurality of machine tools. The server may determine a target load value based on an operating time domain corresponding to each of the plurality of machine tools.

For example, when the operating time domain of the first machine tool 200-1 among the plurality of machine tools arrives, the server may increase the target load value of the first machine tool 200-1. That is, when the operating time domain arrives, a target load increase value of the corresponding machine tool may be determined as a high value.

According to the present disclosure, it is possible to provide a server providing AI-based adaptive feed amount.

Meanwhile, the disclosed embodiments may be implemented in a form of a recording medium storing instructions executable by a computer. The instructions may be stored in a form of program codes, and, when executed by a processor, generate a program module to perform operations of the disclosed embodiments. The recording medium may be implemented as a computer-readable recording medium.

The computer-readable recording medium may include all kinds of recording media in which instructions capable of being decoded by a computer are stored. For example, there may be read only memory (ROM), random access memory (RAM), magnetic tape, magnetic disk, flash memory, optical data storage device, and the like.

Disclosed embodiments are described above with reference to the accompanying drawings. One ordinary skilled in the art to which the present disclosure belongs will understand that the present disclosure may be practiced in forms other than the disclosed embodiments without altering the technical ideas or essential features of the present disclosure. The disclosed embodiments are examples and should not be construed as limited thereto.

While the present disclosure has been described with reference to embodiments, it will be apparent to those skilled in the art that various changes and modifications may be made without departing from the spirit and scope of the present disclosure. Therefore, it should be understood that the above embodiments are not limiting, but illustrative.

What is claimed is:

1. A server for providing an artificial intelligence (AI)-based adaptive feed amount, the server comprising:
   a memory;
   a communication module configured to communicate with at least one machine tool; and
   at least one processor configured to communicate with the memory and the communication module,
   wherein the at least one processor is configured to:

receive a target load value and an initial reasonable load value from a first machine tool in a unit factory;

obtain a first recommended feed change amount, a first recommended tool or base-material rotation speed, and a first recommended cut-in amount by inputting the target load value and the initial reasonable load value of the first machine tool to a first AI model; and transmit, to the first machine tool, a first control signal for controlling an operation of the first machine tool based on the first recommended feed change amount, the first recommended tool or base-material rotation speed, and the first recommended cut-in amount, wherein the initial reasonable load value is a force that a tool applies to a workpiece and is determined differently based on material of the workpiece, a shape of the tool, and a cutting condition, and wherein the server is configured to decrease the target load value when a worker of the first machine tool is replaced.

2. The server of claim 1, wherein the at least one processor is configured to:

receive a first feed value of the first machine tool changed based on the first control signal, and a first load value changed in response to the first feed value from the first machine tool;

obtain a second recommended feed change amount based on the first feed value, the first load value, and the target load value; and transmit a second control signal including the second recommended feed change amount to the first machine tool.

3. The server of claim 1, wherein the target load value is determined based on a target number of processed products to be produced through the first machine tool during a predetermined time.

4. The server of claim 3, wherein the at least one processor obtains the target load value by inputting the target number of processed products and a processed product unit load value into a second AI model.

5. The server of claim 1, wherein the target load value is determined based on at least one of a type of a processed product produced by the first machine tool or whether the type of the processed product is changed during a predetermined time.

6. The server of claim 1, wherein the at least one processor is configured to:

on a basis of a fact that a plurality of machine tools are provided in the unit factory:

determine a feed change amount corresponding to each of the plurality of machine tools based on an initial load value obtained from each of the plurality of machine tools.

7. The server of claim 6, wherein the at least one processor is configured to:

on a basis of the plurality of machine tools operating in time-series sequence:

specify an operating time domain corresponding to each of the plurality of machine tools; and determine the target load value based on the operating time domain corresponding to each of the plurality of machine tools.

8. The server of claim 4, wherein first training data includes a first training target load value, a first initial training load value, and a first target processed product unit feed change amount, and wherein the first AI model is trained to output the first target processed product unit feed change amount based on the first training target load value and the first initial training load value.

9. The server of claim 8, wherein second training data includes a second training target load value, a second initial training load value, a training processed product production amount, and a second target processed product unit feed change amount, and wherein the second AI model is trained to output the second target processed product unit feed change amount based on the second training target load value, the second initial training load value, and the training processed product production amount.

10. The server of claim 1, wherein the at least one processor is configured to:

obtain a pattern of load values per unit time output by the first machine tool; and determine whether the pattern of load values per unit time matches a predefined pattern.

11. The server of claim 10, wherein the at least one processor is configured to:

transmit a third control signal for stopping an operation of the machine tool to the first machine tool, based on a fact that the pattern of load values per unit time does not match the predefined pattern.

12. The server of claim 1, wherein the at least one processor is configured to:

predict a processed product production completion time of the first machine tool according to the target load value; and transmit the predicted processed product production completion time to a terminal device used by a worker of the first machine tool.

13. A method for providing an AI-based adaptive feed amount performed by a server, the method comprising:

receiving a target load value and an initial reasonable load value from a first machine tool in a unit factory;

obtaining a first recommended feed change amount, a first recommended tool or base-material rotation speed, and a first recommended cut-in amount by inputting the target load value and the initial reasonable load value of the first machine tool to a first AI model; and transmitting, to the first machine tool, a first control signal for controlling an operation of the first machine tool based on the first recommended feed change amount, the first recommended tool or base-material rotation speed, and the first recommended cut-in amount, wherein the initial reasonable load value is a force that is tool applies to a workpiece and is determined differently based on material of the workpiece, a shape of the tool, and a cutting condition, and wherein the server is configured to decrease the target load value when a worker of the first machine tool is replaced.

* * * * *